Mar. 20, 1923.

F. HAYDUCK

FOAM DESTROYING DEVICE

Filed Nov. 1, 1920

1,449,114

Inventor
Friedrich Hayduck
By H. H. Bliss
Attorney.

Patented Mar. 20, 1923.

1,449,114

UNITED STATES PATENT OFFICE.

FRIEDRICH HAYDUCK, OF WILMERSDORF, GERMANY, ASSIGNOR TO THE FLEISCHMANN COMPANY, OF NEW YORK, N. Y., A CORPORATION OF OHIO.

FOAM-DESTROYING DEVICE.

Application filed November 1, 1920. Serial No. 421,206.

(GRANTED UNDER THE PROVISIONS OF THE ACT OF MARCH 3, 1921, 41 STAT. L., 1313.)

*To all whom it may concern:*

Be it known that I, FRIEDRICH HAYDUCK, a citizen of Germany, residing at Wilmersdorf, Germany, have invented certain new and useful Improvements in Foam-Destroying Devices (for which application for patent was filed in Germany August 19, 1916, Patent No. 303,801), of which the following is a specification, reference being had thereinto the accompanying drawing.

This invention relates to a foam destroying device and particularly to a device designed to be placed in the foam zone of vessels where foam is formed, which employs the principle of impact to destroy the foam.

An object of this invention is to provide an improved device of this character which is efficient and economical.

In the industrial arts, the production of foam is encountered in vessels where the boiling or aerating of liquids takes place and is an inconvenience. Mechanical means have heretofore been employed to obviate or prevent the formation of foam, as well as the adding of fats. The foam-forming phenomenon is noticeable in the cooking of juices in the sugar industry, in the aerating of worts or nutrient solutions in the yeast industry, and in the distilling of mashes and worts. It is usually posible to diminish the foam quite materially by the use of fats. The use of fats in this manner, however, is costly; the mechanical means heretofore employed have met with only partial success.

The present invention, however, employs means for propelling the foam at high velocity, and suddenly arresting it to reduce it to liquid, and comprises the features of construction, combination of elements, and arrangement of parts, which will be exemplified in the construction hereinafter set forth, and the scope of the application of which will be indicated in the claims.

Figure 1:
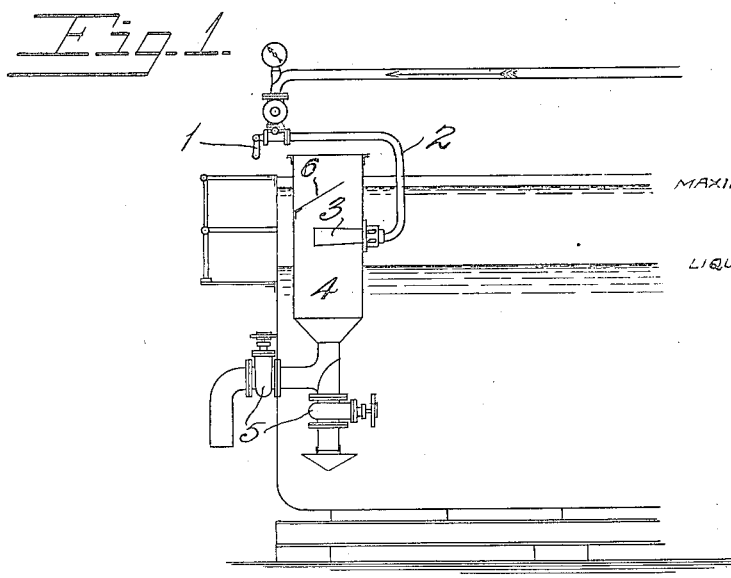
Figure 2:
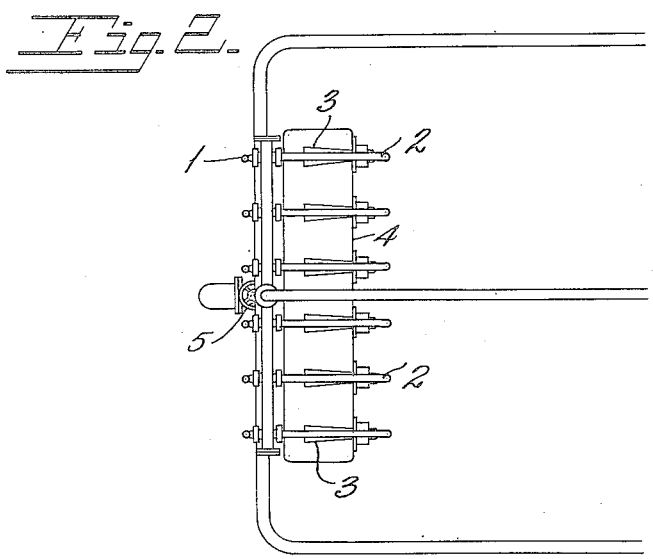

For a fuller understanding of the nature and advantages of this invention, reference should be had to the following detailed description, taken in connection with the accompanying drawing, in which:

Figure 1 is a vertical section through a vessel having a foam destroying device constructed in accordance with this invention; and Fig. 2 is a plan view.

Referring now to the drawing, and particularly to Fig. 1, a vessel containing a liquid is shown having a chamber 4 secured adjacent a wall thereof. Into this chamber project the suction nozzles 3. The normal liquid level in the vessel is indicated by the legend "liquid level." The maximum foam level is similarly indicated by the legend "maximum foam level." Between these levels is located what I have termed the "foam zone." The nozzles 3 are located in this zone. The nozzles 3 are adapted to entrain the foam should it rise to their level in the foam zone. This is acomplished by means of a directed stream of air which is supplied to the nozzles from the conduit 2. This supply for each nozzle is regulated by a valve shown at 1. This permits each nozzle to be selectively controlled in accordance with the foam density where it is located.

Within the chamber 4 there is a deflector plate 6 disposed in inclined position above the nozzles in order to prevent the foam from being thrown out of the chamber 4.

Any liquid within the chamber 4 may be withdrawn through the return passage 5. This passage, as shown, has two branches, one leading to the interior of the vessel, the other leading through the wall of the vessel to a suitable exterior point.

In operation: Air or other suitable fluid under pressure is fed to the nozzles so that the foam is entrained at a high velocity. The foam thus entrained is projected rectilinearly against the interior wall of the chamber 4, which acts as baffle surfaces. The foam thus suddenly arrested is reduced to liquid by the sudden impact.

In the interest of economy, the compressed air blown in may be maintained at a low pressure of 0.10 to 0.40 atmospheres. If a large and sudden formation of foam is to be entrained and drawn off, all the nozzles would be set in operation and the pressure increased. For example, the efficiency of a nozzle increases about 60 per cent when the compression pressure rises from 0.10 to 0.25 atmospheres, as the weight of foam ejected is dependent on the quantity of air passing through the nozzle.

In like manner instead of operating the nozzles with air, steam may be used. When using the device in vacuum apparatus, for example, vacuum cookers, the use of compressed air is eliminated, the nozzles are simply connected with outside air, which under the influence of the vacuum enters with a pressure of from 0.10 to 0.40 atmospheres.

Attempts have been made to throw the foam against the sides of the vessel by centrifugal force by means of a centrifugal wheel and to destroy the foam by impact. This manner of operation has not led to sufficiently satisfactory results because the foam when it reached the impact surface was not destroyed so that it could run down the walls of the vessel as a liquid.

The speed attained by the foam from the centrifugal wheel of from 2000 to 3000 meters per minute is by reason of the small mass of the foam not sufficient to overcome the resistance of the air or even the resistance of a mass of foam and attain the desired result on the surface of the vessel, namely, the destruction of the air bubbles by impact. The best destruction of foam only results when a high speed is imparted to the foam, and in the operation of the device a velocity of up to about 12000 to 18000 meters per minute may be attained in the nozzles of the above described apparatus, for example, by supplying the nozzles with a stream of compressed air, or other suitable fluid under sufficient pressure.

It has also been proposed to remove foam by means of air, with the assistance of a pipe disposed below the level of the liquid. The foam bubbles are here intended to be destroyed by being forced through small holes in the discharge pipe.

In order to overcome the frictional resistance set up it requires a large air pressure. Consequently, the air forced into the liquid again produces foam and acts contrary to the operation desired.

A special advantage which the device of the present invention has, resides in the fact that the foam passing through the nozzles does not again mix with the remaining foam but is conveyed into a separate chamber and there destroyed on the impact surfaces.

Having described my invention, what I claim as new and desire to secure by Letters Patent is:

1. A foam destroying device for vessels comprising a chamber, suction nozzles disposed in the foam zone of said vessel and adapted to entrain foam into the chamber, means for admitting directed streams of air under pressure to said nozzles, and a discharge passage leading from said chamber.

2. A foam destroying device for vessels comprising a chamber, suction nozzles disposed in the foam zone of said vessel and adapted to entrain foam into the chamber, means for admitting directed streams of air under pressure to said nozzles, and means for selectively controlling the air admitting means.

3. A foam destroying device for vessels comprising a chamber, suction nozzles disposed in the foam zone of said vessel and adapted to entrain foam into the chamber, means for admitting directed streams of air under pressure to said nozzles, and a deflector disposed in said chamber above the nozzles.

4. A foam destroying device for vessels comprising a chamber, suction nozzles disposed in the foam zone of said vessel and adapted to entrain foam into the chamber, means for admitting directed streams of air under pressure to said nozzles, means for selectively controlling the air admitting means, a deflector disposed in said chamber above the nozzles, and a discharge passage from said chamber having branches leading respectively to points within and without said vessel.

5. A foam destroying device comprising means for entraining foam, means for propelling the foam rectilinearly at a high velocity, and means for suddenly arresting the propelled foam whereby the foam is reduced to liquid by sudden impact.

In testimony whereof I have affixed my signature.

FRIEDRICH HAYDUCK.